US008339316B1

United States Patent
Mendis (10) Patent No.: US 8,339,316 B1
(45) Date of Patent: Dec. 25, 2012

(54) SMART GPS USE

(75) Inventor: Charles Mendis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 12/855,955

(22) Filed: Aug. 13, 2010

(51) Int. Cl.
*G01S 3/02* (2006.01)
*G01S 19/42* (2010.01)

(52) U.S. Cl. ................... 342/451; 342/357.25; 342/457; 342/463

(58) Field of Classification Search ............... 342/357.2, 342/357.25, 357.46, 451, 457, 463–465; 701/468, 470
See application file for complete search history.

(56) References Cited

U.S. PATENT DOCUMENTS

| 5,982,324 | A | 11/1999 | Watters et al. |
| 7,397,424 | B2 | 7/2008 | Houri |
| 2009/0303121 | A1 | 12/2009 | Alizadeh-Shabdiz |

*Primary Examiner* — Dao Phan
(74) *Attorney, Agent, or Firm* — Lerner, David, Littenberg, Krumholz & Mentlik, LLP (57) ABSTRACT

In one embodiment, a client device generates a location fingerprint. The fingerprint may include various data identified by scanning for WiFi network devices such as the MAC addresses of nearby WiFi access location as well as the respective signal strengths. For each fingerprint location, the client device attempts to use a GPS receiver to scan for GPS satellite signals and identify current GPS latitude and longitude coordinates. After a predetermined period of time, the success or failure of the attempt is recorded and included in the fingerprint. When the client device returns to the location, identified by reviewing the fingerprint, the client device may activate or inhibit the GPS receiver based on the success information of the fingerprint. If the stored data indicates a low success rate, other location identification techniques may be used.

20 Claims, 6 Drawing Sheets

SMART GPS USE

CROSS-REFERENCE TO RELATED APPLICATIONS

This patent application is related to copending U.S. patent application Ser. No. 12/855,961 entitled "MOVING AND STATIONARY DETECTION" filed concurrently herewith on Aug. 13, 2010, the entire disclosure of which is hereby incorporated by reference herein.

BACKGROUND OF THE INVENTION

Various network-based applications allow a user to view the current geographic locations of the user's friends or family. For example, where both parties have given permission, a parent may check the whereabouts of a child by using such an application to view the location of a device physically proximate to the child. In order to make these applications useful, the device, often a mobile phone, must constantly, for example every minute or less, send location updates to a server. Thus the mobile phone must continuously expend processing power to use a GPS receiver to identify the location. This may result in significant drain on the power supply of the client device.

This drain may be even more significant where the GPS receiver is unable to immediately receive data from GPS satellites. For example, GPS works best outside, where reception from the satellites is most effective. If a device is located within a building, the GPS receiver may not be able to receive data from the satellites as the building may interfere with the signals. As many users spend a significant portion of the day inside of buildings, their devices may be continuously attempting to obtain information from GPS satellites unsuccessfully.

BRIEF SUMMARY OF THE INVENTION

Aspects of the invention relate generally to efficient use of a GPS receiver to update a current location of a client device. More specifically, wireless network information may be used to identify locations at which the GPS receiver may be less likely to be able to receive data from GPS satellites. The identified locations may be used as a guide to determine, for example, whether the GPS receiver should currently be used to update the current location of the client device to the server.

One aspect of the invention provides a method of determining whether to use a receiver to determine a current location of a client device. The method includes generating, by a processor of the client device, a location fingerprint for each particular location in a plurality of locations, each location fingerprint including wireless network information, signal strength, and success information, the success information being based on an attempt to scan for location satellites at the particular location; storing the location fingerprints in memory accessible by the processor; identifying wireless network information and corresponding signal strength associated with a current location of the client device; identifying a particular fingerprint of the stored location fingerprints based on the identified wireless network information and corresponding signal strength; and determining whether to use the receiver to determine a new current location based on the success information associated with the particular fingerprint.

In one example, the receiver is a GPS receiver and the method further comprising using the receiver to determine the new current location if the success information falls below a predetermined threshold. In another example, the method also includes using geolocation means other than the receiver to determine the new current location if the success information indicates that success is unlikely. In another example, the location fingerprints each include a new cellular tower identifier, and wherein the method further comprises identifying a cellular tower identifier associated with a current location of the client device, and wherein identifying the particular fingerprint is based on the given cellular tower identifier.

Another aspect of the invention provides a method of determining whether to use a receiver to determine a current geolocation of a client device. The method includes identifying first wireless network information by a processor of the client device; attempting to identify a geolocation of the client device using a GPS receiver for a predetermined period; determining a success value based on whether the attempt was successful; associating the success value with the received wireless network information; storing the association in memory accessibly by the client device; identifying second wireless network information corresponding to the first wireless network information; identifying the success value based on the second wireless network information; and determining whether to use the receiver to determine a current geolocation based on the success value.

In one example, determining whether to use the receiver is based on a comparison of the success value to a threshold value. In another example, the receiver is a GPS receiver and the method further comprising using the receiver to determine the current geolocation if the success value is greater than a threshold value. In another example, the method also includes using the identified second wireless network information to determine the current geolocation if the success value is less than the threshold value. In another example, the method also includes using cellular tower information to determine the current geolocation if the success value is less than the threshold value. In another example, the method also includes determining whether the client device has changed position since a previous position update was transmitted to a server, based on the second wireless network information. In another example, the client device attempts to identify the geolocation of the client device only after determining that the client device has changed position.

Another aspect of the invention provides a method of determining whether to use a receiver to determine a current location of a client device. The method includes receiving, by a processor of a server computer, a location fingerprint for each particular location in a plurality of locations, each location fingerprint including wireless network information, signal strength, and success information, the success information being based on an attempt to scan for location satellites at the particular location; storing the location fingerprints in memory accessible by the processor; receiving wireless network information and corresponding signal strength associated with a current location of the client device; identifying a particular fingerprint of the stored location fingerprints based on the identified wireless network information and corresponding signal strength; generating instructions indicating whether the client device should use a receiver to determine geolocation information, wherein the instructions are based on success information associated with the particular fingerprint; and transmitting the instructions to the client device.

In one example, the method also includes comparing the success information associated with the particular fingerprint to a threshold value. In another example, the receiver is a GPS receiver and if the success value is greater than a threshold value, the instructions indicate that the client device is to use the GPS receiver to determine the current geolocation. In another example, the receiver is a GPS receiver, and if the success value is equal to a particular value, the instructions indicate that the client device is to use the GPS receiver to determine the current geolocation. In another example, the receiver is a GPS receiver, and if the success value is equal to a particular value, the instructions indicate that the client device should not use the GPS receiver to determine the current geolocation.

Another aspect of the invention provides a method of determining whether to use a receiver to determine a current location of a client device. The method includes identifying, by the client device, wireless network information; transmitting the wireless network information to a server computer; receiving instructions generated by the server computer based on the wireless network information and indicating that the client device should not use a GPS receiver to determine geolocation information; and identifying the geolocation information based on the received instructions.

In one example, wireless network information includes MAC addresses and signal strength. In another example, the instructions are based on success information received from a second client device. In another example, the method also includes attempting to use a GPS receiver to determine a current location of the client device; and transmitting, to the server computer, a value indicative of the success of the attempt.

DETAILED DESCRIPTION

Figure 1:
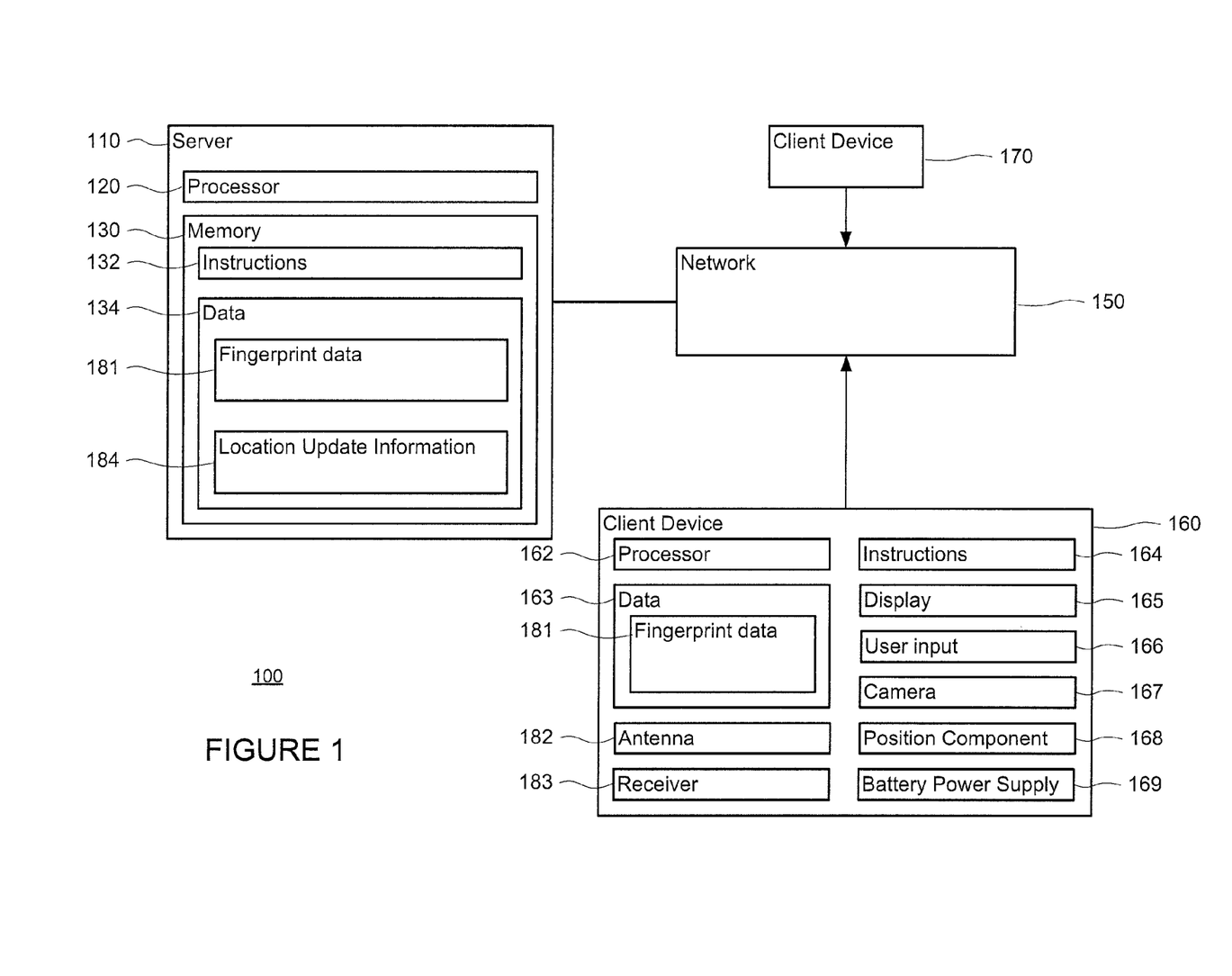
FIG. 1 is a functional diagram of a system in accordance with an aspect of the invention.
Figure 2:
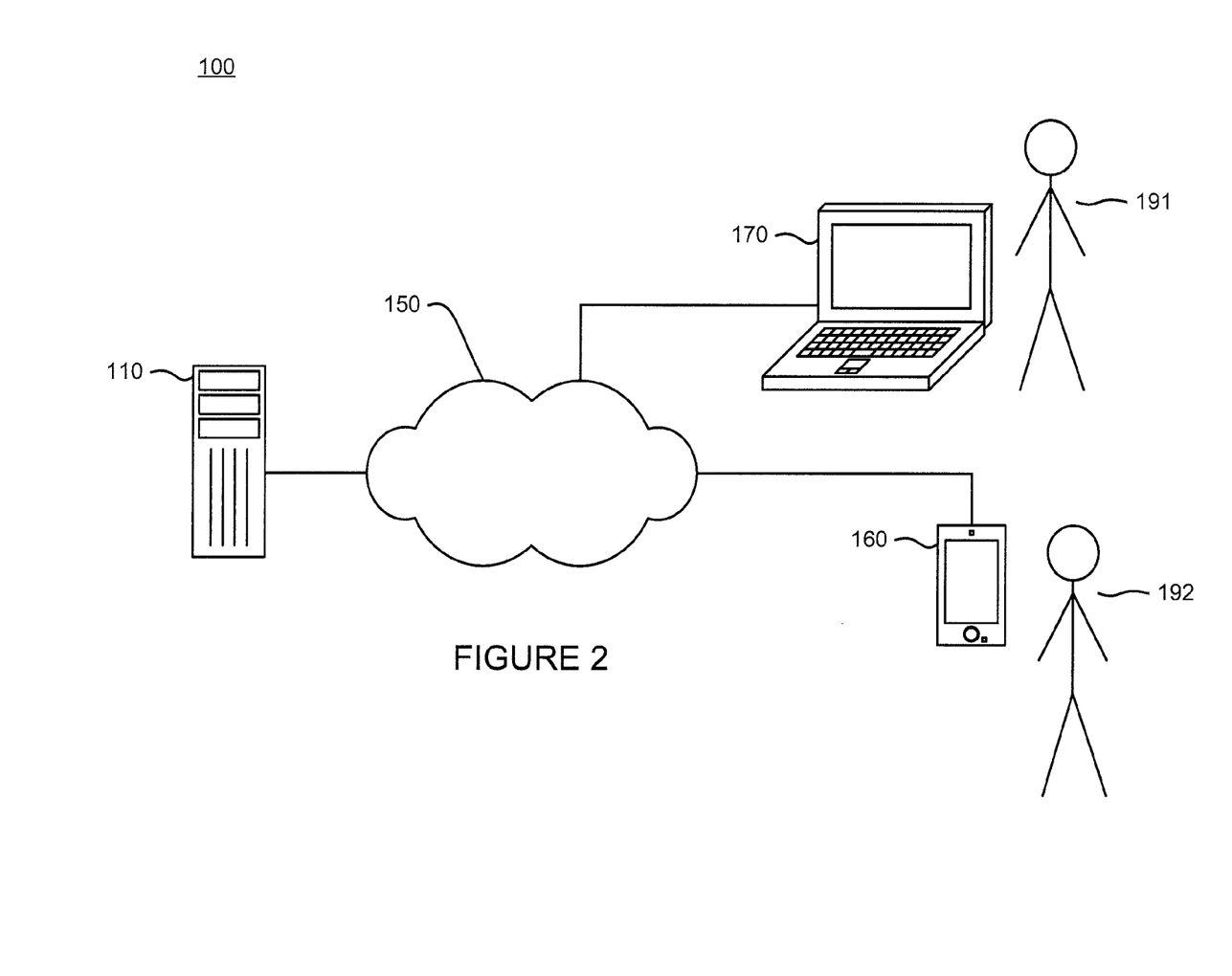
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored, or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, position component 168, accelerometer, speakers, a network interface device, a battery power supply 169 or other power source, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

The client devices may include an antenna 182 and receiver 183 which may be used to scan the WiFi spectrum and identify local WiFi signals. For example, the antenna may send information packets to the receiver which demodulates the data to determine various types of information. The information may include data regarding nearby WiFi network access points such as network SSIDs or Media Access Control ("MAC") addresses as well as the strength of the respective WiFi signals.

Geographic position component 168 may be used to determine the geographic location and orientation of the device. For example, client device 170 may include a GPS receiver used to determine the device's current geolocation or latitude, longitude, and, in some examples, altitude coordinates. Thus, as the client device changes location the client device may use the position component to determine a "new" current location. In another example, the current location of the client device may be determined periodically, for example, after a pre-determined update period, such as every minute or several minutes, has passed. The period may be determined, for example, by the requirements of the application, by the capabilities of the GPS receiver, or by a pre-selected setting of the client device.

The component 168 may also comprise software for determining the position of the device based on other signals received at the client device 170. For example, the geographic location of a cell phone may be determined by identifying one or more cellular tower identifiers ("cellIDs") and requesting the location from a geolocation server based on the cellID. Alternatively, the geographic location of the client device may be determined by triangulating the signals and locations of several cellular towers. In another example, a geographic location may be determined based on identifying nearby WiFi networks and the respective signal strengths and using this information to request the geolocation information from a server based on this information.

Data 163 and/or data 134 may include fingerprint data 181 identified through scanning of wireless networks. For example, for each particular location, the client device may perform a scan and record MAC addresses and respective signal strength. Fingerprint data 181 may include cellular tower information and or satellite information. As will be described in more detail below, the fingerprint data 181 for a particular location may also be associated with a GPS success value indicative of the likelihood that a GPS receiver will be able to identifying a current location of the client device.

Data 134 may also include location update information 184. This information may be received from a plurality of client devices. The location update information may be used to identify the location of a user (with the user's permission) for various applications, such as those which identify a user's location to pre-approved friends or family.

In addition to the operations described below and illustrated in the figures, various operations in accordance with aspects of the invention will now be described. It should also be understood that the following operations do not have to be performed in the precise order described below. Rather, various steps can be handled in a different order or simultaneously.

A client device may periodically report geolocation information to a server (a reporting event). For example, if a client device determines that it has moved, updated location information may be transmitted to the server. If the client device determines that it has not moved, no update information may be sent, or alternatively, an update may be sent to the server indicating that there has been no change.

In order to determine whether the client device is stationary, the client device may scan for information using an antenna and receiver. The received information may be processed to identify nearby WiFi access points, for example, by identifying the MAC addresses and signal strengths of respective network access points. In some examples, the client device may also identify nearby cellular towers, for example by cellID. This identified combination of MAC addresses, signal strengths, and, in some examples, cellIDs may differ based on the location of the client device. For example, at one location, the client device may identify two MAC addresses, MAC-A and MAC-B, with corresponding signals of SIG-A and SIG-B, as well as cellID-1. At another location, the client device may identify three MAC addresses, MAC-C, MAC-D and MAC-E, with corresponding signals of SIG-C, SIG-D, and SIG-E, as well as cellID-2.

Once identified, the information received during the most recent scan or few scans may be stored in memory accessible by the client device. In one example, the scan information may be stored in a temporary memory, such as RAM, or in cache memory of fixed volume where older entries are rewritten once the cache is full.

As noted above, before generating updated location information, the client device may determine whether there has been a change in position since the last reporting event. In one example, the client device may scan for information and compare the received information to the previous scan information. If the previous and current scan information are the same or similar, for example as described in "MOVING AND STATIONARY DETECTION," Ser. No. 12/855,961, the device may determine that it has not been moved and no update information need be reported to the server. For example, the client device may conduct a new scan and identify MAC-A and MAC-B, with corresponding signals of SIG-A and SIG-B as well as cellID-1, if this information is the same as the previously stored information, the client device may determine that the position has not changed. In another example, if the client device identifies MAC-A and MAC-C, with corresponding signals of SIG-A and SIG-C as well as cellID-1, different than the previously stored information, the client device may determine that the position has changed. The updated scan information may also be stored as, or replace previous, current scan information.

If the previous and current scan information differ, the client device may determine that there has been a change in position and may attempt to determine geographic position coordinates. For example, a GPS receiver may receive data from a plurality of GPS satellites to determine latitude and longitude coordinates of the client device. In some examples, the GPS receiver may not be able to identify the latitude and longitude coordinates because the GPS receiver's reception of satellite data is inhibited. This may occur, for example, when the client device is located within a building, or alongside a relatively tall building which reduces the effective range of the satellite signals.

The GPS receiver may attempt to determine the geographic position coordinates for a pre-determined period. For example, the GPS receiver may be activated and attempt to receive data from the GPS satellites to determine geolocation information. The receiver may scan for GPS signals for a pre-determined period, for example 10 seconds. If the attempt is unsuccessful after the period, the client device may prevent or stop the receiver from continuing the scan attempt. If the attempt is successful, the client device may determine its geolocation, for example latitude and longitude coordinates, and transmit this information to the server.

The success or failure of the attempt may be recorded and stored in memory accessible by the client device. For example, the success or failure may be recorded based on a single indicator, yes or no, zero or one, on or off, etc. In another example, the success or failure rate may be recorded on a sliding scale (e.g. 1-10, A-E, etc.). A first attempt that is successful towards the beginning of the pre-determined period may have a greater success value than a second attempt which is successful towards the end of the predetermined period. Both of these attempts may have a success value which is greater than a third attempt which is unsuccessful. The success value may also be decreasing in scale. For example, a successful attempt may be associated with a lower value than an unsuccessful attempt. It will be understood that any number of scales or values may be used to identify success or failure, and be either increasing or decreasing in value.

The success value described above may be used to generate a location "fingerprint" for the location. The fingerprint may include the success value and the scan information. For example, if the client device has moved and the scan identified MAC-A and MAC-C with corresponding signals of SIG-A and SIG-B as well as cellID-1, and the attempt was successful, the client device may store a fingerprint such as: MAC-A, MAC-B; SIG-A, SIG-B; cellID-1; YES. If the attempt was unsuccessful: MAC-A, MAC-B; SIG-A, SIG-B; cellID-1; NO. The success value associated with the fingerprint may be based on one or more attempts. In that regard, the client device may return to the same location (identified by the scan information) one or more times before generating a complete fingerprint. The fingerprint may be stored in persistent or long term memory accessible by the client device.

After the client device has transmitted the relevant geolocation information to the server and after a predetermined update period has passed, the client device may again attempt to determine whether the device has moved by scanning for information as described above. If the client device has moved, it may determine whether the currently scanned information corresponds to any of the stored fingerprint data. For example, each particular fingerprint may be identified based on the scan information included in the fingerprint. In that regard, a particular fingerprint may be identified based on a MAC address or combination of MAC addresses and signal strengths. Similarly, each fingerprint may be identified based on a cellID or a combination of cellID, MAC addresses, and signal strength. For example, if the client device identifies the MAC addresses, MAC-A and MAC-C with SIG-A and SIG-C and cellID-1, the client device may determine if this combination, or a similar combination as described in "MOVING AND STATIONARY DETECTION," Ser. No. 12/855,961, is included in a previously stored fingerprint. If not, the client device may attempt to determine geolocation using the GPS receiver as described above. If the client device identifies a fingerprint including a substantially similar combination, the client device may also identify the success value associated with the stored fingerprint.

The client device may use the identified success value to determine whether the device should attempt to determine its geolocation using the GPS receiver. For example, if the success value indicates that the client device had previous success receiving data from the GPS satellites or is now likely to currently be successful scanning for GPS satellite signals, the client device may continue to use the GPS receiver to identify the geolocation of the client device. If the success value indicates that the client device previously did not have success or is now unlikely to be successful, the client device may use an alternative method of determining geolocation such as by using the WiFi signals, cellID or other methods. In another example, the client device may use an alternative method if the success value is below a threshold or equal to a particular value. Similarly the client device may use a GPS receiver if the success value is greater than a threshold or equal to a particular value. It will be understood that the reverse of the above may also be used, for example, not equal to a certain value, etc.

Figure 3:
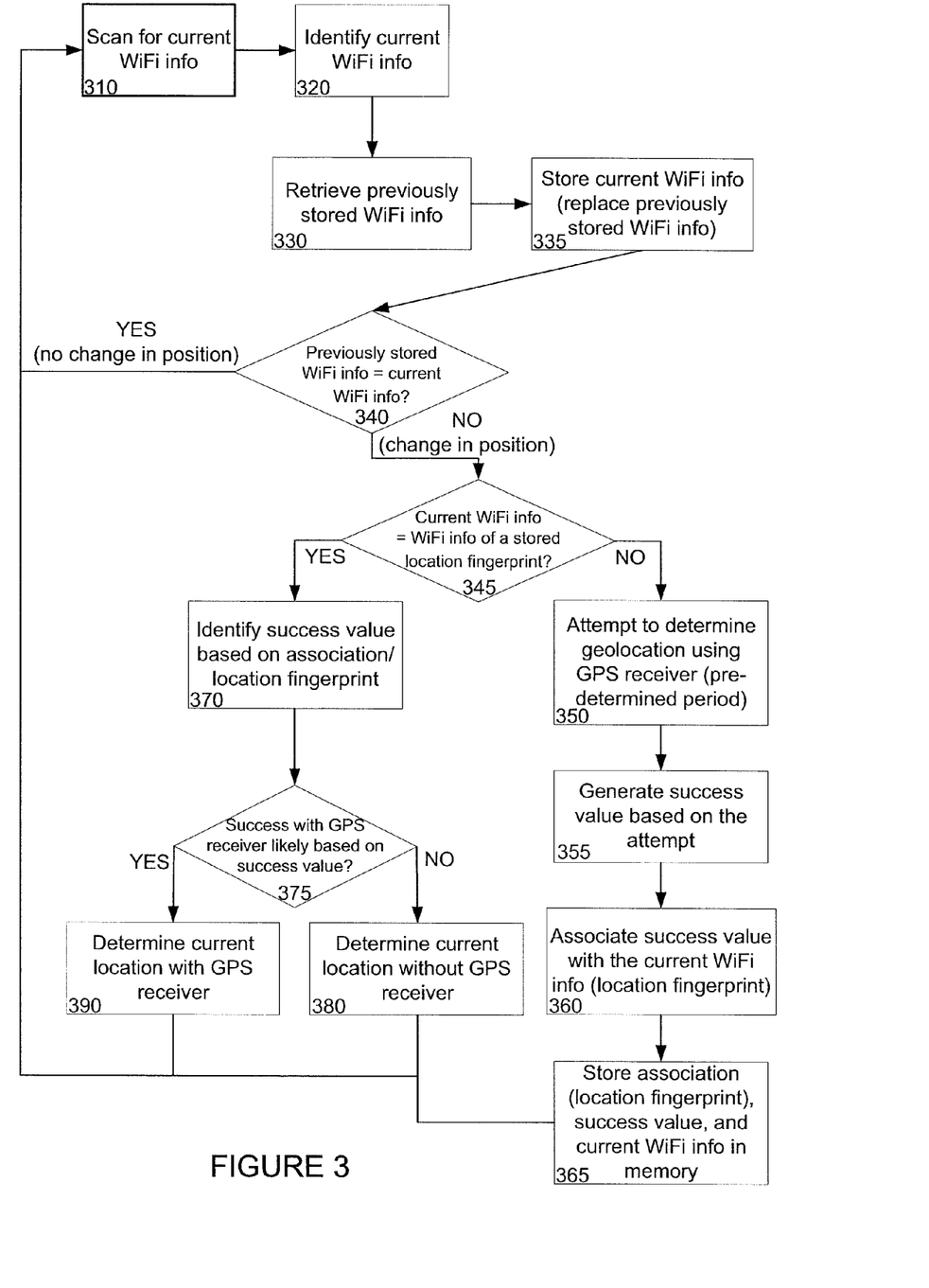
FIG. 3 is a flow diagram in accordance with aspects of the invention.

FIG. 3 is an exemplary flow diagram of one embodiment of the invention. As shown in block 310, the client device scans for WiFi information. Once current WiFi information has been identified at block 320, the client device retrieves previously stored WiFi information at block 330 in order to determine whether the client device has changed position since the previous scan. Then, at block 335, the client device may store the current WiFi information for the next scan, for example by replacing the previously stored WiFi information of the previous scan. While the steps at block 335 is shown as occurring before the step at block 340, it will be understood that the step of block 335 may be completed any time after the current WiFi information has been identified at block 320.

The client device compares the previously stored WiFi information to the current WiFi information at block 340. If these values are the same or similar, the client device concludes that there has been no change in position, and the process returns to block 310 to conduct a new scan for WiFi information after some predetermined update period has passed. If these values are not the same or substantially similar, the client device determines that there has been a change in position and attempts to determine new geolocation information for the current position.

The client device then determines whether the current WiFi information corresponds to WiFi information of a previously stored fingerprint at block 345. If not, the client device attempts to determine the current geolocation using a GPS receiver for a predetermined period at block 350. Based on the success or failure of the attempt, the client device may generate or determine a success value at block 355. The success value is associated with the current WiFi information to generate a location fingerprint at block 365. The association or location fingerprint, including the success value and current WiFi information, is stored in memory accessible by the client device at block 365. Once again, the process returns to block 310 to conduct a new scan for WiFi information.

Returning to block 345, if the identified WiFi information corresponds (e.g. is the same or similar) to the WiFi information of a stored location fingerprint, the client device identifies a success value of the corresponding fingerprint at block 370. The client device next determines whether to use the GPS receiver to determine the current geolocation by determining whether the success value indicates that the GPS receiver will be able to successfully determine geolocation information at block 375. If success is unlikely, the client device determines the current geolocation without using the GPS receiver at block 380. If success is likely, the client device determines the current geolocation using the GPS receiver at block 390. Once the current geolocation has been determined, the process again returns to block 310 to conduct a new scan for WiFi information.

In one embodiment, in addition to or instead of storing the fingerprints locally at the client device, the information may be stored at a server. For example, after a user has provided permission to do so, the user's client device may transmit a fingerprint to the server. The server may receive the fingerprint from the client device as well as from a plurality of fingerprint(s) from a plurality of client devices. The server may store the fingerprints securely, for example, by encrypting and/or storing the information in secure data storage.

Receiving and storing the location fingerprints from a plurality of client devices may allow the server to identify various patterns. For example, the server may identify "blackout" locations or locations associated with a particular MAC address at which no device has been able to scan and receive signals from the GPS satellites or where reception is very unlikely.

The server may use the stored fingerprints to generate instructions indicating whether the client device should use a particular method to determine geolocation information. For example, the server may receive a request for instructions regarding whether to use the GPS receiver to identify a geolocation including the WiFi and/or cellID information from the most recent scan. in this case, the server uses the received information to identify a relevant fingerprint as described above. The server transmits the success value to the client device for processing as described above (for example at block 375 of FIG. 3) or simply information instructing the client device whether to use the GPS receiver based on the success value. In response, the client device may attempt to use the GPS receiver to identify a geolocation or some other method based on the information received from the server.

Figure 4A:
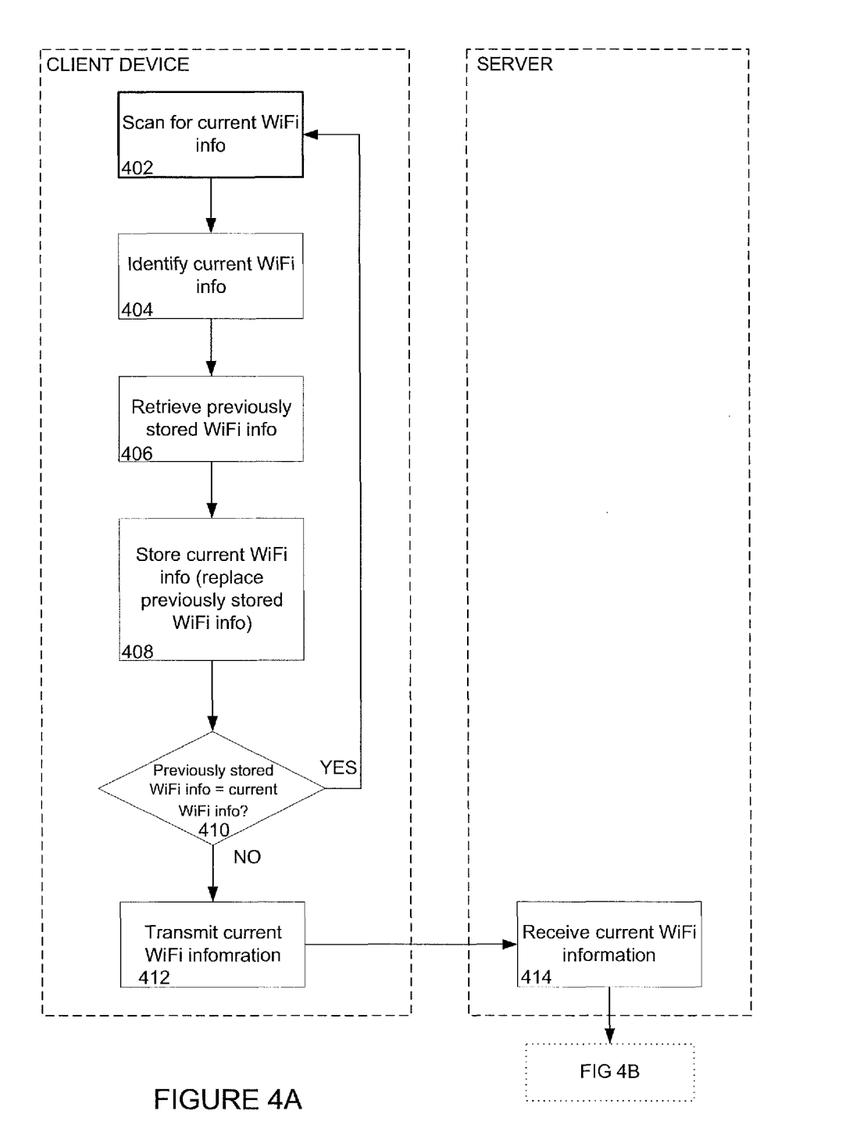
FIGS. 4A-4C are a flow diagram in accordance with aspects of the invention.
Figure 4B:
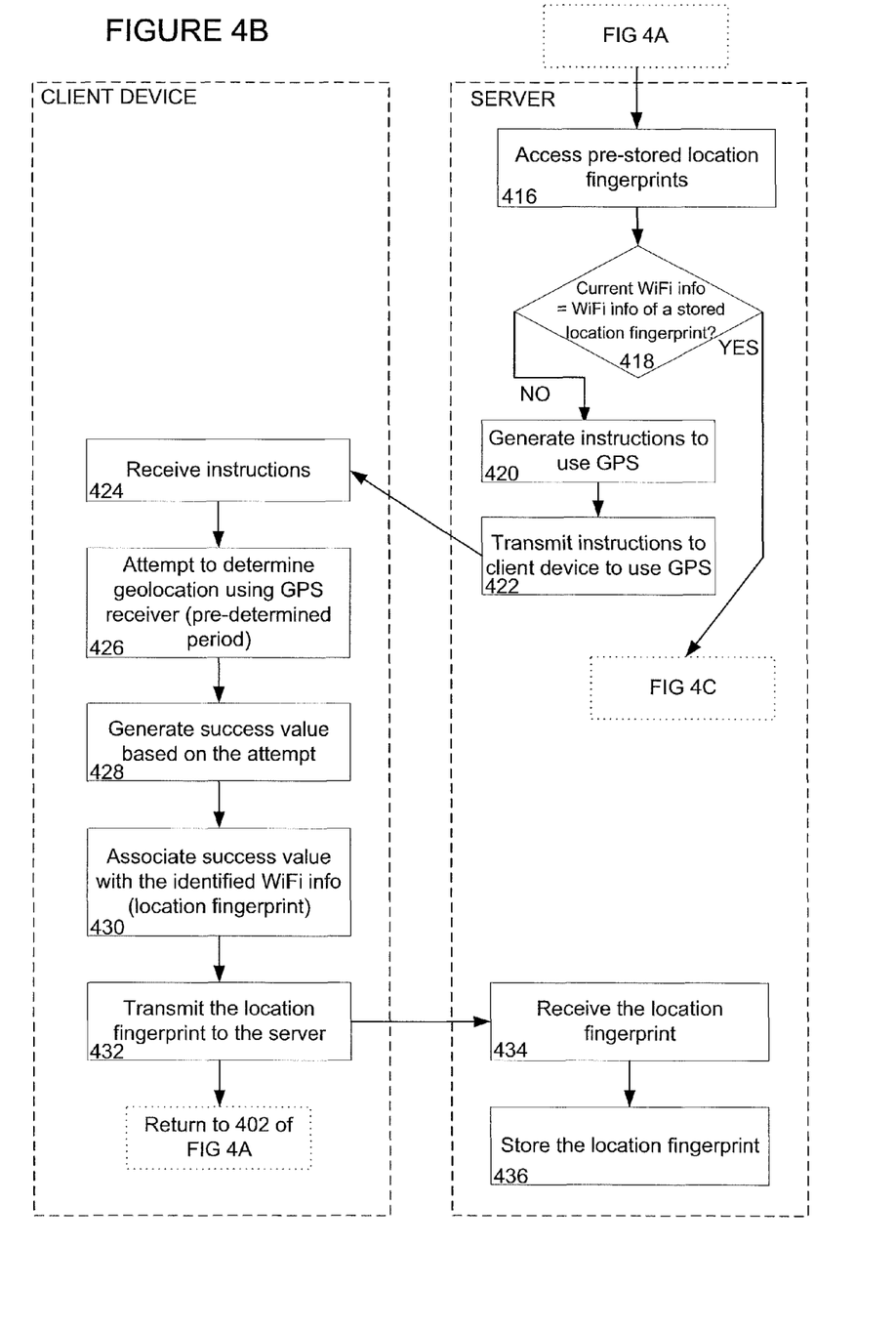
Figure 4C:
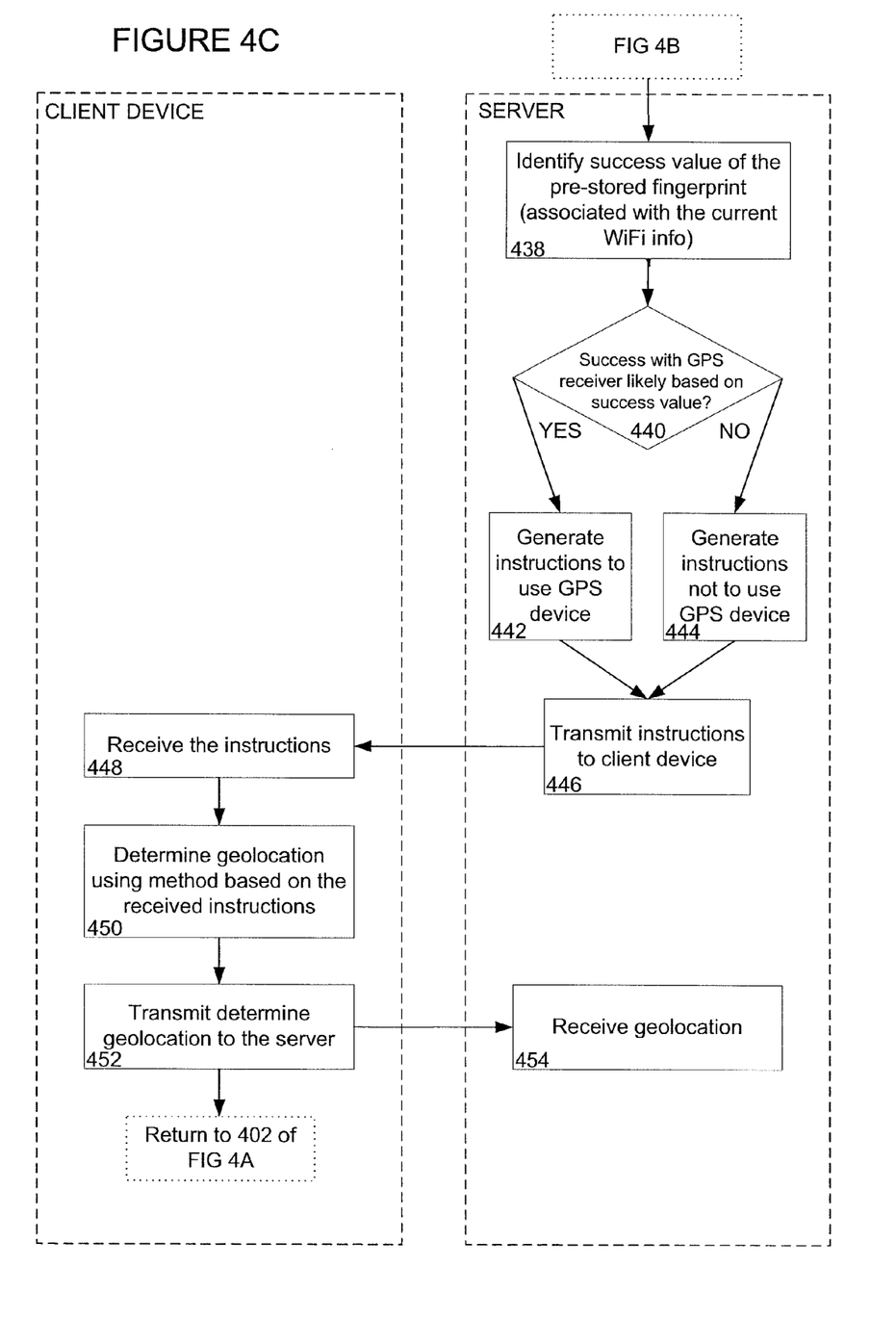

FIGS. 4A-4C are an exemplary flow diagram of one embodiment of the invention in a client-server arrangement. As shown in block 402 of FIG. 4A, the client device scans for WiFi information. Once current WiFi information has been identified at block 404, the client device retrieves previously stored WiFi information at block 406 in order to determine whether the client device has changed position since the previous scan. Then, at block 408, the client device may store the current WiFi information for the next scan, for example by replacing the previously stored WiFi information of the previous scan. It will be understood that while the steps at block 408 is shown as occurring before the step at block 410, it will be understood that the step of block 408 may be completed any time after the current WiFi information has been identified at block 404.

The client device compares the previously stored WiFi information to the current WiFi information at block 410. If these values are the same or substantially similar, the client device concludes that there has been no change in position, and the process returns to block 402 to conduct a new scan for WiFi information after some predetermined update period has passed. If these values are not the same or substantially similar, the client device may transmit the current WiFi information to the server as shown in block 412.

The server receives the current WiFi information at block 414. Moving to FIG. 4B, the server accesses pre-stored location fingerprints at block 416. The server determines whether the current WiFi information corresponds to WiFi information of the pre-stored location fingerprints at block 418. If not, the server generates instructions for the client device to use the GPS receiver to determine the current geolocation information at block 420. The instructions are transmitted to and received by the client device at blocks 422 and 424, respectively. The client device attempts to determine the current geolocation using the GPS receiver for a pre-determined period at block 426. The client device then generates a success value based on the outcome of the attempt at block 428. The success value is associated with the current WiFi information to generate a location fingerprint at block 430. The association or location fingerprint, including the success value and current WiFi information are transmitted to and received by the server at blocks 432 and 434, respectively. The server stores the location fingerprint in memory at block 436. The process returns to block 402 of FIG. 4A client device conducts a new scan for WiFi information.

Returning to block 418 of FIG. 4B, if the server determines that the current WiFi information corresponds to WiFi information of a pre-stored location fingerprint, the process moves to block 438 of FIG. 4C. The server identifies the success value of the corresponding pre-stored location fingerprint. The server then determines from the success value whether it is likely that the GPS receiver will successfully receive data from GPS satellites and determine geolocation information at block 440. If so, the server generates instructions for the client device to use the GPS receiver to determine the current geolocation at block 442. If not, the server generates instructions for the client device not to use the GPS receiver, and for example, to use some other geolocation method, at block 444. The generated instructions are transmitted to and received by the client device at blocks 446 and 448, respectively. The client device determines a geolocation based on the instructions received from the server at block 450. Once the geolocation information has been determined, it is transmitted to and received by the server at blocks 452 and 454, respectively. The process returns to block 402 of FIG. 4A client device conducts a new scan for WiFi information.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of determining whether to use a receiver to determine a current location of a client device, the method comprising:

generating, by a processor of the client device, a location fingerprint for each particular location in a plurality of locations, each location fingerprint including wireless network information, signal strength, and success information, the success information being based on an attempt to scan for location satellites at the particular location;

storing the location fingerprints in memory accessible by the processor;

identifying wireless network information and corresponding signal strength associated with a current location of the client device;

identifying a particular fingerprint of the stored location fingerprints based on the identified wireless network information and corresponding signal strength; and determining whether to use the receiver to determine a new current location based on the success information associated with the particular fingerprint.

2. The method of claim 1, wherein the receiver is a GPS receiver and the method further comprising using the receiver to determine the new current location if the success information falls below a predetermined threshold.

3. The method of claim 1, further comprising using geolocation means other than the receiver to determine the new current location if the success information indicates that success is unlikely.

4. The method of claim 1 wherein the location fingerprints each include a new cellular tower identifier, and wherein the method further comprises identifying a cellular tower identifier associated with a current location of the client device, and wherein identifying the particular fingerprint is based on the given cellular tower identifier.

5. A method of determining whether to use a receiver to determine a current geolocation of a client device, the method comprising:

identifying first wireless network information by a processor of the client device;

attempting to identify a geolocation of the client device using a GPS receiver for a predetermined period;

determining a success value based on whether the attempt was successful;

associating the success value with the received wireless network information;

storing the association in memory accessibly by the client device;

identifying second wireless network information corresponding to the first wireless network information;

identifying the success value based on the second wireless network information; and determining whether to use the receiver to determine a current geolocation based on the success value.

6. The method of claim 5, wherein determining whether to use the receiver is based on a comparison of the success value to a threshold value.

7. The method of claim 6, wherein the receiver is a GPS receiver and the method further comprising using the receiver to determine the current geolocation if the success value is greater than a threshold value.

8. The method of claim 6, further comprising using the identified second wireless network information to determine the current geolocation if the success value is less than the threshold value.

9. The method of claim 6, further comprising using cellular tower information to determine the current geolocation if the success value is less than the threshold value.

10. The method of claim 5, further comprising determining whether the client device has changed position since a previous position update was transmitted to a server, based on the second wireless network information.

11. The method of claim 10, wherein the client device attempts to identify the geolocation of the client device only after determining that the client device has changed position.

12. A method of determining whether to use a receiver to determine a current location of a client device, the method comprising:

receiving, by a processor of a server computer, a location fingerprint for each particular location in a plurality of locations, each location fingerprint including wireless network information, signal strength, and success information, the success information being based on an attempt to scan for location satellites at the particular location;

storing the location fingerprints in memory accessible by the processor;

receiving wireless network information and corresponding signal strength associated with a current location of the client device;

identifying a particular fingerprint of the stored location fingerprints based on the received wireless network information and corresponding signal strength;

generating instructions indicating whether the client device should use a receiver to determine geolocation information, wherein the instructions are based on success information associated with the particular fingerprint; and transmitting the instructions to the client device.

13. The method of claim 12, further comprising comparing the success information associated with the particular fingerprint to a threshold value.

14. The method of claim 13, wherein the receiver is a GPS receiver and if the success value is greater than a threshold value, the instructions indicate that the client device is to use the GPS receiver to determine the current geolocation.

15. The method of claim 13, wherein the receiver is a GPS receiver, and if the success value is equal to a particular value, the instructions indicate that the client device is to use the GPS receiver to determine the current geolocation.

16. The method of claim 13, wherein the receiver is a GPS receiver, and if the success value is equal to a particular value, the instructions indicate that the client device should not use the GPS receiver to determine the current geolocation.

17. A method of determining whether to use a receiver to determine a current location of a client device, the method comprising:

identifying, by a processor of the client device, wireless network information;

transmitting the wireless network information to a server computer;

receiving instructions generated by the server computer based on the wireless network information and indicating that the client device should not use a GPS receiver to determine geolocation information; and identifying the geolocation information based on the received instructions.

18. The method of claim 17, wherein the wireless network information includes MAC addresses and signal strength.

19. The method of claim 17, wherein the instructions are based on success information received from a second client device.

20. The method of claim 17, further comprising:

attempting to use a GPS receiver to determine a current location of the client device; and transmitting, to the server computer, a value indicative of the success of the attempt.

* * * * *